Oct. 13, 1953 — W. C. NABORS — 2,655,388
SPRING SUSPENSION FOR VEHICLE TRAILERS
Filed Sept. 21, 1949
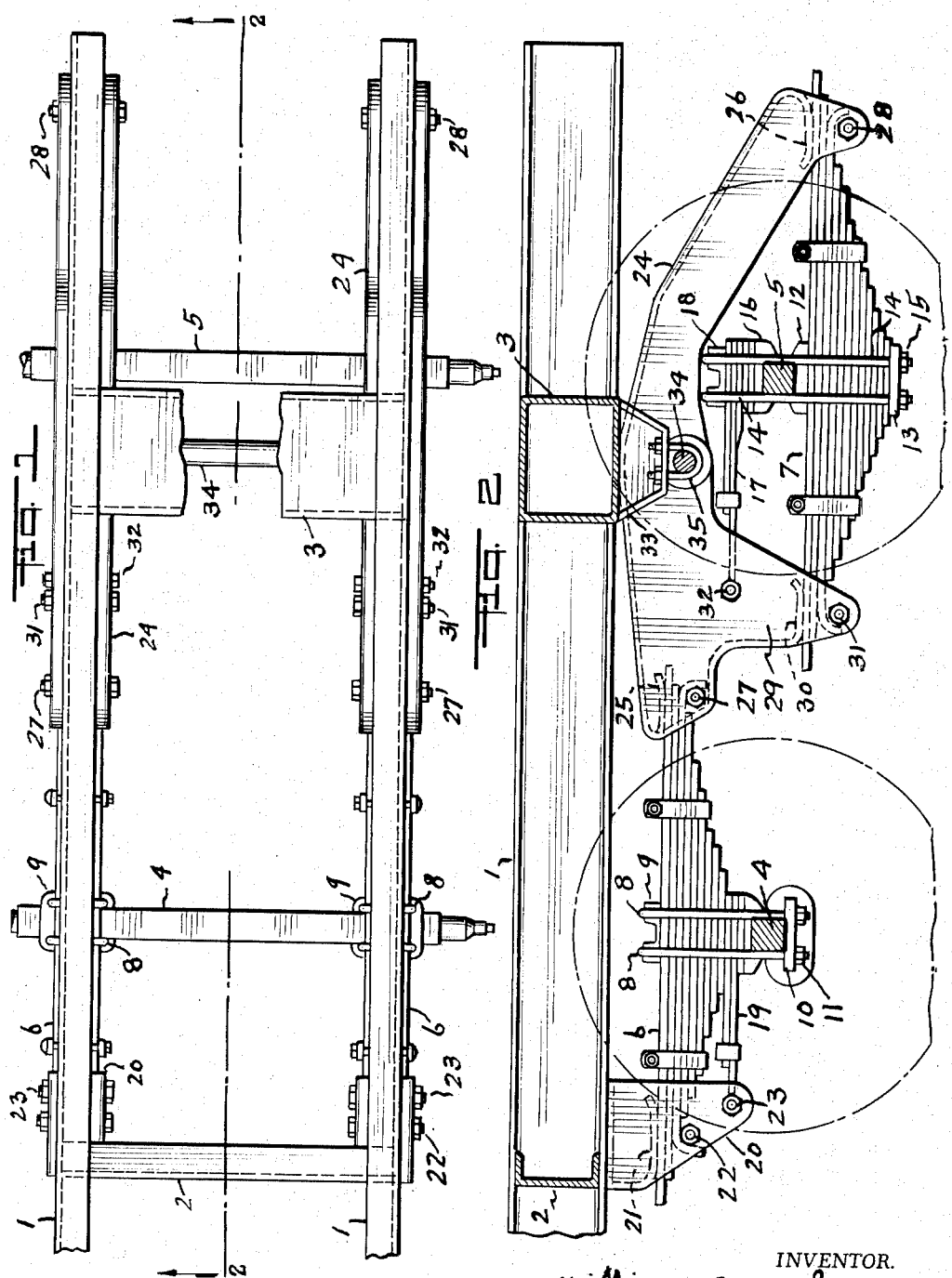
INVENTOR.
William C. Nabors
BY
E. V. Hardway
ATTORNEY

UNITED STATES PATENT OFFICE 2,655,388

SPRING SUSPENSION FOR VEHICLE TRAILERS

William C. Nabors, Mansfield, La.

Application September 21, 1949, Serial No. 116,969

1 Claim. (Cl. 280—104.5)

An object of the present invention is to provide novel spring suspension for the axles of trailers, said suspension including tandem springs and inter-connections between said springs whereby the springs on either side will simultaneously co-act and will thereby distribute the loads or shocks to which said springs would otherwise be subjected independently and unequally due to variations in the roadways.

Another object of the invention is to provide a spring suspension which operates, upon the application of the brakes, to distribute the spring loading so as to maintain equal load distribution on the tires to preserve equal friction resistance on the road surface, thus making the brakes effective to prevent skidding.

It is another object of the present invention to provide a suspension of the character described including tandem springs for supporting the trailer frame on each side so mounted on the axles and so connected to the frame and to each other that the shock transmitted from the load to the springs will be equalized to the end that the tandem springs, on each side of the vehicle, will have the load carried by them equally distributed to both springs.

It is a further object of the invention to provide a tandem axle trailer with a novel type of spring suspension for the axles of such type that it is very simple, composed of few parts, and of a construction that will enable it to be readily installed or dismounted as circumstances may require.

Other objects and advantages will be apparent from the following specification, which is illustrated by the accompanying drawings, wherein:

Figure 1 is a plan view of the suspension apparatus as viewed from the trailer frame, and;

Figure 2 is a vertical, sectional view taken on the line 2—2 of Figure 1.

Referring now more particularly to the drawings, wherein like numerals of reference designate the same parts in each of the figures, the trailer frame is composed of the side channels 1, 1, spaced the required distance apart and connected by suitable cross-channels as 2. Rearwardly of a cross-channel 2 there is a box-like cross beam 3, rectangular in vertical cross-section, and whose ends are anchored to the side channels 1, 1, preferably by welding. There are the front and rear axles 4 and 5. These axles are spaced a distance apart so as to provide sufficient clearance between the carrying wheels, which may be mounted to rotate on spindles on the respective ends of said axles.

On each side of the trailer there is a front spring assembly, said assemblies being designated generally by the numerals 6, 6, and on each side of the trailer frame there is a rear spring assembly, said rear spring assemblies being designated by the numeral 7.

These spring assemblies are secured to the respective axles 4 and 5, the front assemblies being mounted on the front axles and the rear assemblies being secured beneath the rear axle. Each spring is made up of a leaf assembly.

The front assembly is clamped in place on the axle 4 by means of the inverted U-bars 8, 8, which fit around the corresponding bracket 9, on the assembly, and which embrace the leaves and also the front axle 4. Underneath the front axle 4 there are the clamp plates 10, through which the free ends of the U-bars pass, and said free ends are threaded to receive the clamp nuts 11, which are screwed thereon to securely hold the spring leaves clamped to the axle.

The rear axle assembly on each side is made up of spring leaves and disposed underneath the rear axle 5. The rear axle 5 is seated on brackets as 12, which brackets, in turn, are seated on the spring assembly beneath. Underneath each assembly 7 there is the clamp plate 13. There are the inverted U-bars 14, 14 on each side of the axle 5 and which embrace the corresponding spring leaf assembly, and whose free ends extend through the corresponding clamp plate 13, and said free ends are threaded to receive the clamp nuts 15 which are screwed thereon to securely hold the spring leaves clamped to the axle.

Mounted on the rear axle 5 and embraced by said U-bars there is a bracket 16, and on this bracket there is clamped the rear end of the forwardly extending radius bar 17. On the rear end of this bar there is a bracket 18 which is clamped in place by said U-bars and which in turn clamps said radius bar 17 in place.

Each forward spring leaf assembly is also provided with a forwardly extended radius bar 19 whose rear end is clamped assembled with the leaves by the U-bars 8, 8 and whose other end extends forwardly.

Associated with the forward end of each forward spring assembly there is an inverted U-shaped bracket 20. Each bracket 20 has a web between its side flanges, and this web, at one end, is cut, or otherwise severed, from the side flanges, and is inwardly turned between the side flanges, thus forming a bearing plate 21, which bears downwardly against the forward end of the corresponding spring assembly 6. Spaced beneath this bearing plate the bracket 20 has a transverse bolt 22 extending therethrough, and the adjacent end of the leaf resting on said bolt is curved downwardly, forwardly of the bolt, so as to form retention of the assembly; also there is a transverse bolt at the lower end of the bracket which extends through the side plates thereof anad the forward end of the radius bar 19 is suitably secured to this bolt 23.

There are the equalizer beams, designated generally by the numerals 24, 24. They are substantially arcuate in side elevation. They are of channel shaped construction, having the side plates and the intervening web. At the ends of each equalizer beam the web is severed from the side plate and turned inwardly, thus forming the front and rear bearing plates 25, 26, which rest on the rear end of the corresponding front spring assembly 6 and the rear end of the corresponding spring assembly 7 with the bearing plates 25, 26 resting on said ends of the spring assembly. Each equalizer beam has the transverse front and rear bolts 27 and 28. One leaf of the spring assembly 6 has its forward end bent downwardly over the corresponding transverse bolt 22, and the rear end of this leaf is also bent downwardly over the transverse bolt 27.

Each equalizer beam, at its forward end, has a downward extension, or arm, 29, and at the free end of this arm the web is severed at its margins from the side plates and turned inwardly forming a bearing plate 30. The bearing plates 26, 30 rest on the rear and front ends of the corresponding leaf assembly 7.

At the extremity of the arm 29 there is a transverse bolt 31 and a leaf of each assembly 7 has its rear and forward ends bent down over the bolts 28—31.

The forward end of the radius bar 17 has a bearing on a transverse bolt 32, carried by each of the arms 29.

Depending from each end of the cross-beam 3 there are the anchors as 33, and beneath these anchors there is the transverse rod 34 whose ends are connected to the corresponding equalizer beams and which pivot in suitable transverse bearings 35 which depend from the anchors 33.

In operation, the equalizer beam distributes to springs with which it is connected, the load, to which one of the springs would, otherwise, be subjected individually. Therefore, each tandem spring is caused to carry a portion only of the load, thus relieving the other spring or springs of the total load. As a further illustration, assuming that one of the wheels might strike an obstruction in the road and move upwardly, lifting that end of the corresponding beam which is connected to it, whereby the opposite end of said equalizer beam will move downwardly against the resilience of the other spring, both springs acting simultaneously to divide the shock and thereby lessen it. Of course, should the other wheel of the tandem pair hit an elevated obstruction, a converse action would thereupon take place.

Upon the application of brakes, a distribution of spring loading takes place.

Preferably, the equalizer beams are movable independently of each other. This will make the equipment more flexible, although it will successfully operate if the equalizer beams are fixed to the rod 34.

What I claim is:

In a trailer vehicle, a frame, front and rear transverse supporting axles for the frame, tandem spring assemblies underneath each side of the frame and mounted on the axles, means supporting the frame on the forward end of the front spring assembly, an equalizer beam mounted on the frame to pivot on a transverse axis and supported on the rear ends of said spring assemblies, and also by the forward end of the rear spring assembly, and a forwardly extended radius bar secured to the rear axle and whose forward end is pivotally connected to said beam.

WILLIAM C. NABORS.

References Cited in the file of this patent

UNITED STATES PATENTS

| Number | Name | Date |
|---|---|---|
| 1,891,399 | Ahlm et al. | Dec. 20, 1932 |
| 2,280,302 | Reid | Apr. 21, 1942 |
| 2,424,141 | Black | July 15, 1947 |
| 2,493,024 | Pointer | Jan. 3, 1950 |
| 2,493,026 | Pointer | Jan. 3, 1950 |

FOREIGN PATENTS

| Number | Country | Date |
|---|---|---|
| 399,951 | Great Britain | Oct. 19, 1933 |